(12) United States Patent
Yu (10) Patent No.: US 9,818,431 B2
(45) Date of Patent: Nov. 14, 2017

(54) MULTI-SPEAKER SPEECH SEPARATION

(71) Applicant: MICROSOFT TECHNOLOGY LICENSING, LLC, Redmond, WA (US)

(72) Inventor: Dong Yu, Bothell, WA (US)

(73) Assignee: Microsoft Technoloogy Licensing, LLC, Redmond, WA (US)

( * ) Notice: Subject to any disclaimer, the term of this patent is extended or adjusted under 35 U.S.C. 154(b) by 22 days.

(21) Appl. No.: 14/976,078

(22) Filed: Dec. 21, 2015

(65) Prior Publication Data

US 2017/0178666 A1  Jun. 22, 2017

(51) Int. Cl.
*G10L 25/30* (2013.01)
*G10L 25/18* (2013.01)
*G10L 15/20* (2006.01)
*G10L 15/197* (2013.01)
*G10L 25/21* (2013.01)
(Continued)

(52) U.S. Cl.
CPC ............ *G10L 25/30* (2013.01); *G06N 3/0445* (2013.01); *G10L 15/07* (2013.01); *G10L 15/16* (2013.01); *G10L 15/197* (2013.01); *G10L 15/20* (2013.01); *G10L 15/22* (2013.01); *G10L 15/26* (2013.01); *G10L 17/18* (2013.01);
(Continued)

(58) Field of Classification Search
CPC .................... G10L 15/197; G10L 2015/223
See application file for complete search history.

(56) References Cited

U.S. PATENT DOCUMENTS 5,317,673 A * 5/1994 Cohen .................. G10L 15/144
  704/232
5,461,697 A 10/1995 Nishimura et al.
(Continued)

FOREIGN PATENT DOCUMENTS

CN     103400577 B    9/2015
WO     2015157013 A1  10/2015

OTHER PUBLICATIONS

Zhao, et al., "Deep Neural Networks for Cochannel Speaker Identification", In Proceedings of 40th IEEE International Conference on Acoustics, Speech and Signal Processing, Apr. 19, 2015, pp. 4824-4828.
(Continued)

*Primary Examiner* — Qian Yang
(74) *Attorney, Agent, or Firm* — Shook, Hardy & Bacon, LLP (57) ABSTRACT

The technology described herein uses a multiple-output layer RNN to process an acoustic signal comprising speech from multiple speakers to trace an individual speaker's speech. The multiple-output layer RNN has multiple output layers, each of which is meant to trace one speaker (or noise) and represent the mask for that speaker (or noise). The output layer for each speaker (or noise) can have the same dimensions and can be normalized for each output unit across all output layers. The rest of the layers in the multiple-output layer RNN are shared across all the output layers. The result from the previous frame is used as input to the output layer or to one of the hidden layers of the RNN to calculate results for the current frame. This pass back of results allows the model to carry information from previous frames to future frames to trace the same speaker.

21 Claims, 5 Drawing Sheets

(51) Int. Cl.
| | |
|---|---|
| *G10L 15/22* | (2006.01) |
| *G10L 15/26* | (2006.01) |
| *G06N 3/04* | (2006.01) |
| *G10L 15/16* | (2006.01) |
| *G10L 17/18* | (2013.01) |
| *G10L 21/0272* | (2013.01) |
| *G10L 15/07* | (2013.01) |

(52) U.S. Cl.
CPC .......... *G10L 21/0272* (2013.01); *G10L 25/18* (2013.01); *G10L 25/21* (2013.01); *G10L 2015/223* (2013.01)

(56) References Cited

U.S. PATENT DOCUMENTS

| | | | |
|---|---|---|---|
| 5,794,191 A | 8/1998 | Chen | |
| 6,453,284 B1 | 9/2002 | Paschall | |
| 2002/0178131 A1* | 11/2002 | Tani | G06N 3/049 706/15 |
| 2014/0257804 A1* | 9/2014 | Li | G10L 15/16 704/232 |
| 2014/0257805 A1 | 9/2014 | Huang et al. | |
| 2016/0035367 A1* | 2/2016 | Goesnar | G10L 21/0208 704/228 |
| 2016/0111108 A1* | 4/2016 | Erdogan | G10L 21/0216 704/202 |

OTHER PUBLICATIONS

Wang, et al., "A Neural Network for Time-Domain Signal Reconstruction: Towards Improving the Perceptual Quality of Supervised Speech Separation", In Technical Report OSU-CISRC-4/14-TR11, Retrieved on: Oct. 12, 2015, 10 pages.
Wang, et al., "On Training Targets for Supervised Speech Separation", In Proceedings of IEEE/ACM Trans Audio Speech Lang Process, vol. 22, Issue 12, Dec. 2014, pp. 1-28.
Zhou, et al., "Lexical Tone Recognition with an Artificial Neural Network", In Journals of Ear & Hearing, vol. 29, Issue 3, Jun. 2008, 14 pages.
Liu, et al., "Using Neural Network Front-Ends on Far Field Multiple Microphones Based Speech Recognition ", In Proceedings of IEEE International Conference on Acoustics, Speech and Signal Processing, May 4, 2014, 5 pages.
Lovell, et al., "Speaker Verification Using Artificial Neural Networks", In Proceedings of the Third Australian Speech Science and Technology Conference, Retrieved on: Oct. 12, 2015, 6 pages.
Almaadeed, et al., "Speaker Identification Using Multimodal Neural Networks and Wavelet Analysis", In IET Biometrics, vol. 4, Issue 1, Mar. 2015, pp. 18-28.
Tachioka, et al., "Discriminative Methods for Noise Robust Speech Recognition: A Chime Challenge Benchmark", In Proceeding of 2nd International Workshop on Machine Listening in Multisource Environments, Jun. 1, 2013, pp. 19-24.
Yanhui, et al., "Deep Neural Network Based Speech Separation for Robust Speech Recognition", In Proceeding of 12th International Conference on Single Processing, Oct. 19, 2014, pp. 532-536.
Narayanan, et al., "Ideal Ratio Mask Estimation Using Deep Neural Networks for Robust Speech Recognition", In Proceedings of IEEE International Conference on Acoustics, Speech and Signal Processing, May 26, 2013, pp. 7092-7096.
Jun, et al., "Speech Separation of a Target Speaker Based on Deep Neural Networks", In Proceeding of 12th International Conference on Single Processing, Oct. 19, 2014, pp. 473-477.
Hershey, et al., "Super-Human Multi-Talker Speech Recognition: A Graphical Model Approach", In Journal of Computer Speech and Language, vol. 24, Issue 1, Jan. 2010, pp. 45-66.
Kristjansson, et al., "Super-Human Multi-Talker Speech Recognition: the IBM 2006 Speech Separation Challenge System", In Proceedings of Ninth International Conference on Spoken Language Processing, Sep. 17, 2006, pp. 97-100.
Ming, et al., "Combining Missing-Feature Theory, Speech Enhancement, and Speaker-Dependent/Independent Modeling for Speech Separation", In Journal of Computer Speech and Language, vol. 24, Issue 1, Jan. 2010, pp. 67-76.
Schmidt, et al., "Single-Channel Speech Separation using Sparse Non-Negative Matrix Factorization", In Proceedings of Ninth International Conference on Spoken Language Processing, Sep. 2006, 4 pages.
Shao, et al., "A Computational Auditory Scene Analysis System for Speech Segregation and Robust Speech Recognition", In Journal of Computer Speech and Language, vol. 24, Issue 1, Jan. 2010, pp. 77-93.
Virtanen, Tuomas, "Speech Recognition Using Factorial Hidden Markov Models for Separation in the Feature Space", In Proceedings of Ninth International Conference on Spoken Language Processing, Sep. 17, 2006, pp. 1-4.
Weiss, et al., "Speech Separation Using Speaker-Adapted Eigenvoice Speech Models", In Journal of Computer Speech and Language, vol. 24, Issue 1, Jan. 2010, pp. 16-129.
Weng, et al., "Deep Neural Networks for Single-Channel Multi-Talker Speech Recognition", In Proceedings of IEEE/ACM Transactions on Audio, Speech, and Language Processing, vol. 23, Issue 10, Oct. 2015, pp. 1670-1679.
Huang, et al., "Deep Learning for Monaural Speech Separation", In IEEE International Conference on Acoustics, Speech and Signal Processing, May 4, 2014, pp. 1562-1566.
Po-Sen, et al., "Joint Optimization of Masks and Deep Recurrent Neural Networks for Monaural Source Separation", In IEEE/ACM Transactions on Audio, Speech and Language Processing, vol. 23, Issue 12, Aug. 13, 2015, pp. 2136-2147.
Tu, et al., "Speech Separation based on Signal-Noise Dependent Deep Neural Networks for Robust Speech Recognition", In IEEE International Conference on Acoustics, Speech and Signal Processing, Apr. 19, 2015, pp. 61-65.
"International Search Report and Written Opinion Issued in PCT Application No. PCT/US2016/066430", dated Mar. 24, 2017, 14 Pages.

\* cited by examiner

MULTI-SPEAKER SPEECH SEPARATION

BACKGROUND

Automatic speech recognition (ASR) allows a computing device to understand human speech. Understanding human speech enables voice-to-text transcription and voice commands, among other functions. In real world situations, especially when far-field microphones are used, overlapping speech from multiple speakers (i.e., people talking simultaneously) or speech mixed with noise or music can decrease speech recognition accuracies. This is because, when a far-field microphone is used, the energy of the competing speakers, when measured by the microphone, can be very close to the energy of the speech from the target speaker. This is very different from the close-talk microphone scenario where the target speaker speaks much closer to the microphone than other speakers. In the close-talk microphone scenario, the target to masking ratio (TMR) is typically quite high and high fidelity can be kept in the captured speech. Automatic speech recognition (ASR) can use language models for determining plausible word sequences for a given language using the result of an audio processing as input.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein allows a computing device to distinguish between multiple audio signals which may have similar power levels. In one aspect, the multiple audio signals include background noise and two or more human speakers. The technology described herein can comprise an acoustic model that uses a recursive neural network (RNN) to process the raw audio signal to generate a signal-specific audio signal that represents the utterances of a single speaker. The signal-specific audio signal could be processed to form a sequence of words that can enable human-to-computer interactions.

The technology described herein uses a multiple-output layer RNN to process an acoustic signal comprising speech from multiple speakers to trace an individual speaker's speech. The multiple-output layer RNN has multiple output layers, each of which is meant to trace one speaker (or noise) and represents the mask for that speaker (or noise). The output layer for each speaker (or noise) can have the same dimensions and can be normalized for each output unit across all output layers. The rest of the layers in the multiple-output layer RNN are shared across all the output layers. The output of the current frame of all the output layers will affect the output of the next time frame. The result from the previous frame is used as input to the output layer or to one of the hidden layers of the RNN to calculate results for the current frame. This pass back of results allows the model to carry information from previous frames to future frames.

The number of output layers can be changed dynamically (e.g., implemented with a gate). For example, when the multiple people are speaking simultaneously and one of the traced speakers stops talking, the gate can be closed to prevent data from being sent to the output layer associated with the now silent speaker.

BRIEF DESCRIPTION OF THE DRAWINGS

Aspects of the technology are described in detail below with reference to the attached drawing figures, wherein.

DETAILED DESCRIPTION

The subject matter of the technology described herein is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein allows a computing device to distinguish between multiple audio signals having similar power levels. In one aspect, the multiple audio signals include background noise and two or more human speakers. The power levels, potentially measured in decibels, of the two or more human speakers can be similar to the power level of the background noise. In other words, the audio signals associated with the human speakers can have a signal to noise ratio close to 1:1. In one aspect, the audio signals analyzed by the technology described herein can be captured by a far-field microphone.

The technology described herein can comprise an acoustic model that uses a multiple-output layer RNN to process the raw audio signal to generate a signal-specific audio signal that represents the utterances of a single speaker. The signal-specific audio signal could be processed by a secondary acoustic model that identifies phonemes, or other linguistic units that make up speech, within the audio signal. The phonemes could then be processed by a language model that converts the series of phonemes into a sequence of words that can enable human-to-computer interactions.

The technology described herein uses a multiple-output layer RNN to process an acoustic signal comprising speech from multiple speakers to trace an individual speaker's speech. The multiple-output layer RNN has multiple output layers, each of which is meant to trace one speaker (or noise) and represents the mask for that speaker (or noise). The output layer for each speaker (or noise) can have the same dimensions and can be normalized for each output unit across all output layers. The rest of the layers in the multiple-output layer RNN are shared across all the output layers.

The input layer of the multiple-output layer RNN can receive features or representations of the audio signal as input. The features can comprise multiple representations extracted during different methods. Exemplary methods include amplitude modulation spectrograph, relative spectral transform and perceptual linear prediction, mel-frequency, cepstral coefficients, and cochleagram response. Each methodology may be used to generate a different set of representations for the audio signal. The input can be a single feature frame or a window of frames.

The output of the current frame of all the output layers will affect the output of the next time frame. The result from the previous frame is used as input to the output layer or to one of the hidden layers of the multiple-output layer RNN to calculate results for the current frame. This pass back of results allows the model to carry information from previous frames to future frames.

The number of output layers can be changed dynamically (e.g., implemented with a gate). For example, when the multiple people are speaking simultaneously and one of the traced speakers stops talking, the gate can be closed to prevent data from being sent to the output layer associated with the now silent speaker.

Computing Environment

Figure 1:
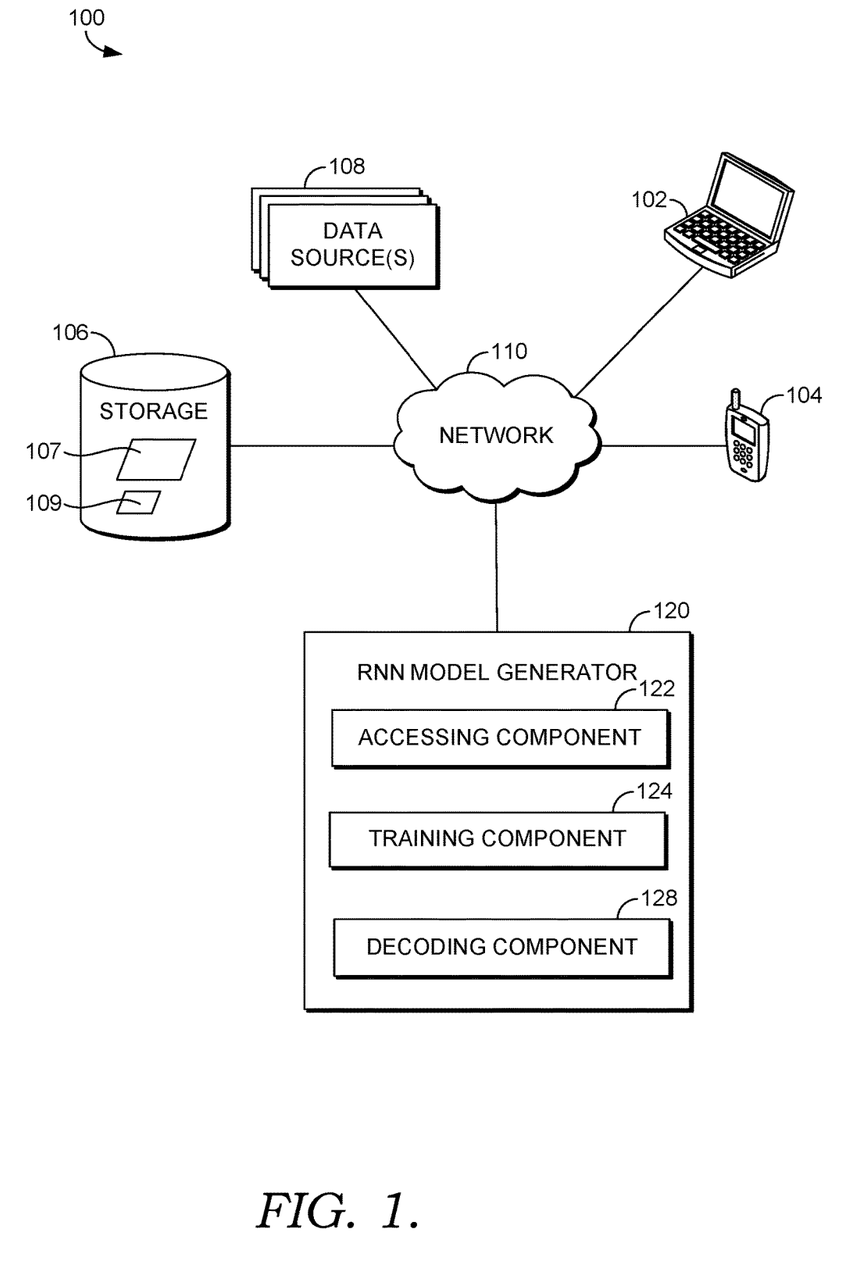
FIG. 1 is a block diagram of an exemplary computing environment suitable for generating and using a multiple-output layer RNN, in accordance with an aspect of the technology described herein.

Turning now to FIG. 1, among other components not shown, system 100 includes network 110 communicatively coupled to one or more data source(s) 108, storage 106, client devices 102 and 104, and multiple-output layer RNN model generator 120 ("RNN model generator"). The components shown in FIG. 1 may be implemented on or using one or more computing devices, such as computing device 500 described in connection to FIG. 5. Network 110 may include, without limitation, one or more local area networks (LANs) and/or wide area networks (WANs). Such networking environments are commonplace in offices, enterprise-wide computer networks, intranets, and the Internet. It should be understood that any number of data sources, storage components or data stores, client devices, and RNN model generators may be employed within the system 100 within the scope of the technology described herein. Each may comprise a single device or multiple devices cooperating in a distributed environment. For instance, the RNN model generator 120 may be provided via multiple computing devices or components arranged in a distributed environment that collectively provide the functionality described herein. Additionally, other components not shown may also be included within the network environment.

Example system 100 includes one or more data source(s) 108. Data source(s) 108 comprise data resources for training the multiple-output layer RNN models described herein. The data provided by data source(s) 108 may include labeled and un-labeled data, such as transcribed and un-transcribed data. For example, in an embodiment, the data includes one or more phone sets (sounds) and may also include corresponding transcription information or senone labels that may be used for initializing the multiple-output layer RNN model. The training data can include audio of multiple speakers talking simultaneously along with an ideal ratio mask (IRM) for an individual speaker for each frame and bin. The training data can also include the frequency spectrum for the speech of a single speaker.

In an embodiment, the un-labeled data in data source(s) 108 is provided by one or more deployment-feedback loops. For example, usage data from spoken search queries performed on search engines may be provided as un-transcribed data. Other examples of data sources may include by way of example, and not limitation, various spoken-language audio or image sources including streaming sounds or video, web queries, mobile device camera or audio information, web cam feeds, smart-glasses and smart-watch feeds, customer care systems, security camera feeds, web documents, catalogs, user feeds, SMS logs, instant messaging logs, spoken-word transcripts, gaming system user interactions such as voice commands or captured images (e.g., depth camera images), tweets, chat or video-call records, or social-networking media. Specific data source(s) 108 used may be determined based on the application including whether the data is domain-specific data (e.g., data only related to entertainment systems, for example) or general (non-domain-specific) in nature.

Example system 100 includes client devices 102 and 104, which may comprise any type of computing device where it is desirable to have an automatic speech recognition (ASR) system on the device. For example, in one embodiment, client devices 102 and 104 may be one type of computing device described in relation to FIG. 5 herein. By way of example and not limitation, a user device may be embodied as a personal data assistant (PDA), a mobile device, smartphone, smart watch, smart glasses (or other wearable smart device), augmented reality headset, virtual reality headset, a laptop, a tablet, remote control, entertainment system, vehicle computer system, embedded system controller, appliance, home computer system, security system, consumer electronic device, or other similar electronics device. In one embodiment, the client device is capable of receiving input data such as audio and image information usable by an ASR system described herein that is operating on the device. For example, the client device may have a microphone or line-in for receiving audio information, a camera for receiving video or image information, or a communication component (e.g., Wi-Fi functionality) for receiving such information from another source, such as the Internet or a data source 108.

The ASR model using a multiple-output layer RNN model described herein can process the inputted data to determine computer-usable information. For example, a query spoken by a user into a far-field microphone while multiple people in the room are talking may be processed to determine the content of the query (i.e., what the user is asking for).

Example client devices 102 and 104 are included in system 100 to provide an example environment wherein the multiple-output layer RNN model may be deployed. Although it is contemplated that aspects of the multiple-output layer RNN model described herein may operate on one or more client devices 102 and 104, it is also contemplated that some embodiments of the technology described herein do not include client devices. For example, a multiple-output layer RNN model may be embodied on a server or in the cloud. Further, although FIG. 1 shows two example client devices, more or fewer devices may be used.

Storage 106 generally stores information including data, computer instructions (e.g., software program instructions, routines, or services), and/or models used in embodiments of the technology described herein. In an embodiment, storage 106 stores data from one or more data source(s) 108, one or more multiple-output layer RNN models, information for generating and training multiple-output layer RNN models, and the computer-usable information outputted by one or more multiple-output layer RNN models. As shown in FIG. 1, storage 106 includes multiple-output layer RNN models 107 and 109, both with multiple speaker-specific output layers. Additional details and examples of multiple-output layer RNN models are described in connection to FIGS. 2-5. Although depicted as a single data store component for the sake of clarity, storage 106 may be embodied as one or more information stores, including memory on client device 102 or 104, RNN model generator 120, or in the cloud.

RNN model generator 120 comprises an accessing component 122, a training component 124, and a decoding component 128. The RNN model generator 120, in general, is responsible for generating multiple-output layer RNN models, including creating new multiple-output layer RNN models (or adapting existing multiple-output layer RNN models). The multiple-output layer RNN models generated by RNN model generator 120 may be deployed on a client device such as device 104 or 102, a server, or other computer system. RNN model generator 120 and its components 122, 124, and 128 may be embodied as a set of compiled computer instructions or functions, program modules, computer software services, or an arrangement of processes carried out on one or more computer systems, such as computing device 500, described in connection to FIG. 5, for example. RNN model generator 120, components 122, 124, and 128, functions performed by these components, or services carried out by these components may be implemented at appropriate abstraction layer(s) such as the operating system layer, application layer, hardware layer, etc., of the computing system(s). Alternatively, or in addition, the functionality of these components, RNN model generator 120, and/or the embodiments of technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Continuing with FIG. 1, accessing component 122 is generally responsible for accessing and providing to RNN model generator 120 training data from one or more data sources 108. In some embodiments, accessing component 122 may access information about a particular client device 102 or 104, such as information regarding the computational and/or storage resources available on the client device. In some embodiments, this information may be used to determine the optimal size of an RNN model generated by RNN model generator 120 for deployment on the particular client device.

Figure 3:
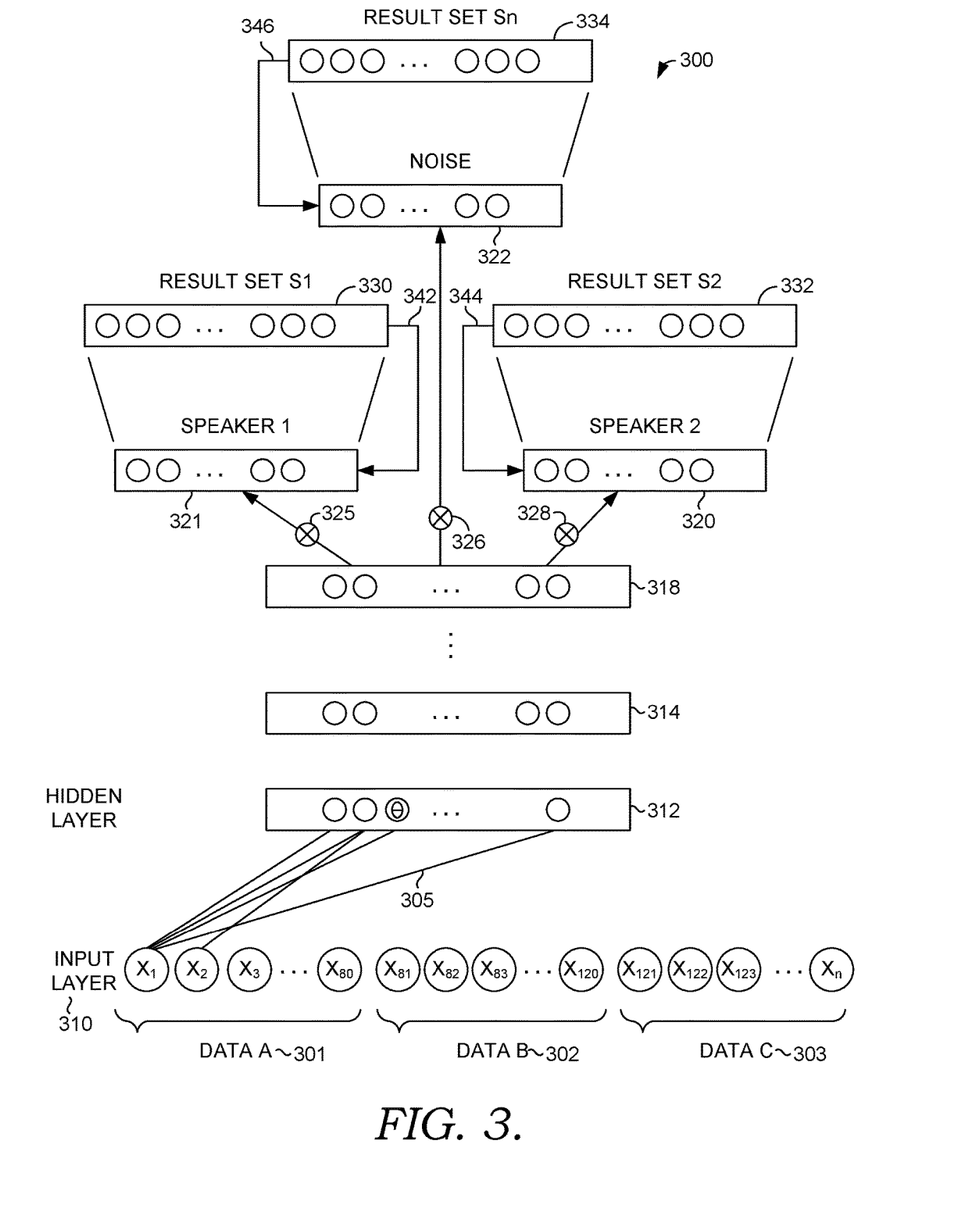
FIG. 3 is a diagram depicting an exemplary architecture for implementing multiple-output layer RNN, in accordance with an aspect of the technology described herein.

In one embodiment, a multiple-output layer RNN model comprises a model and may be embodied as a specific structure of mapped probabilistic relationships of an input onto a set of appropriate outputs, such as illustratively depicted in FIG. 3. The probabilistic relationships (shown as connected lines between the nodes 305 of each layer) may be determined through training. Thus, in some embodiments of the technology described herein, multiple-output layer RNN model 300 is defined according to its training. (An untrained RNN model therefore may be considered to have a different internal structure than the same RNN model that has been trained.)

Returning to FIG. 1, the training component 124 adjusts parameters within a multiple-output layer RNN model. Aspects of the technology described herein can use either ideal ratio mask (IRM) or complex ideal ratio mask (cIRM) for a training target (label) for each frame and bin. Minimum mean square error (MMSE) can be the training criterion. Once the mask is estimated the technology can estimate the spectrum from the mask. Another training criterion is thus the MMSE between the reconstructed spectrum (or wave) and the clean (single-speaker) speech.

Alternatively, the technology described herein can use the context-dependent phone or phone state as the target and cross entropy as the training criterion, at each frame.

IRM $|M_{t,f}|$ is defined as:

$$|M_{t,f}| = \frac{|S_{t,f}|}{|Y_{t,f}|} \quad (1)$$

Where $|S_{t,f}|$ is the magnitude of the speech spectrogram $S_{t,f}$ at time t and bin f, and $|Y_{t,f}|$ is the magnitude of the mixed-speech spectrogram $Y_{t,f}$. It is clear that $0 \le |M_{t,f}| \le 1$ and can be easily modeled using a sigmoid (or softmax) function.

cIRM $M_{t,f}$ can be derived as:

$$S_r + iS_i = (M_r + iM_i)(Y_r + iY_i) = (M_r Y_r - M_i Y_i) + i(M_r Y_i + M_i Y_r) \quad (2)$$

or $$M_r = \frac{S_r Y_r + S_i Y_i}{Y_r Y_r + Y_i Y_i} \quad (3)$$

$$M_i = \frac{S_i Y_r - S_r Y_i}{Y_r Y_r + Y_i Y_i} \quad (4)$$

Where $x_r$ and $x_i$ are the real and imaginary part of the complex value x. $M_r$ and $M_i$ are not bounded in a range, e.g., [0, 1] as in the $|M_{t,f}|$ case. One solution is to force $M_r$ and $M_i$ to be within a predefined range of $[-L, L]$, where L is a positive integer that can be set to 1. In the cIRM case, the mean square error (MSE) criterion to be minimized is the average MSE of the real and imaginary part of the mask.

Note that for cIRM, we have $$Y_r = \sum_j (M_r^j Y_r - M_i^j Y_i) = Y_r \sum_j M_r^j - Y_i \sum_j M_i^j \quad (5)$$

and $$Y_i = \sum_j (M_r^j Y_i + M_i^j Y_r) = Y_i \sum_j M_r^j + Y_r \sum_j M_i^j \quad (6)$$

where they sum over the speakers (and noise) j. We thus have $$1 = \sum_j M_r^j \quad (7)$$

and $$0 = \sum_j M_i^j \quad (8)$$

both can be normalized by subtracting the mean.

By defining $$\overline{M}_r = \frac{\sum_j M_r^j}{J} \text{ and } \overline{M}_i = \frac{\sum_j M_i^j}{J},$$

we get normalized masks as $$\check{M}_r^j = M_r^j - \overline{M}_r + \frac{1}{J} \quad (9)$$
$$\check{M}_i^j = M_i^j - \overline{M}_i$$

Labels are assigned and used to train the model. In one aspect, synthesized mixed speech data is used for training. The synthesized speech data can combine speech signals from each speaker into a single signal. Labels can be generated by analyzing the single speech signals to identify the mask or phone (state) label for each speaker in each frame. During training the technology can force the same speaker signal to the same output layer. To break the symmetry, the technology can assign the speaker to output layers based on a predefined order. If in the previous frame none of the speakers exist, then the new speaker can always be assigned to the first output layer.

The decoding component 128 applies the trained multiple-output layer RNN model to categorize audio data according to speakers within the audio data. The decoding component 128 can output an ideal ratio mask (IRM) for an individual speaker. The decoding component 128 can output a different mask for each speaker in the audio. The mask can be used to generate an isolated audio signal for an individual speaker. The isolated audio signal for a particular speaker can then be isolated and analyzed to recognize the speech content.

In one aspect, the audio mask is generated on a frame-by-frame basis. Alternatively, a mask can be calculated for a window of frames using input comprising the frames that make up the window. An average of the estimations from different windows can improve the final estimation result.

In another aspect when cIRM is used, the real and imaginary part of the mask are estimated separately and combined to form the complex mask. At the same time, we can estimate a magnitude ratio, i.e., IRM. Since the technology described herein can reconstruct the clean speech magnitude using both IRM and cIRM it can find a reconstruction that minimizes the overall estimation error. In one aspect, the technology can keep the phase computed from cIRM and select the magnitude that is the average of that estimated from cIRM and IRM.

Figure 2:
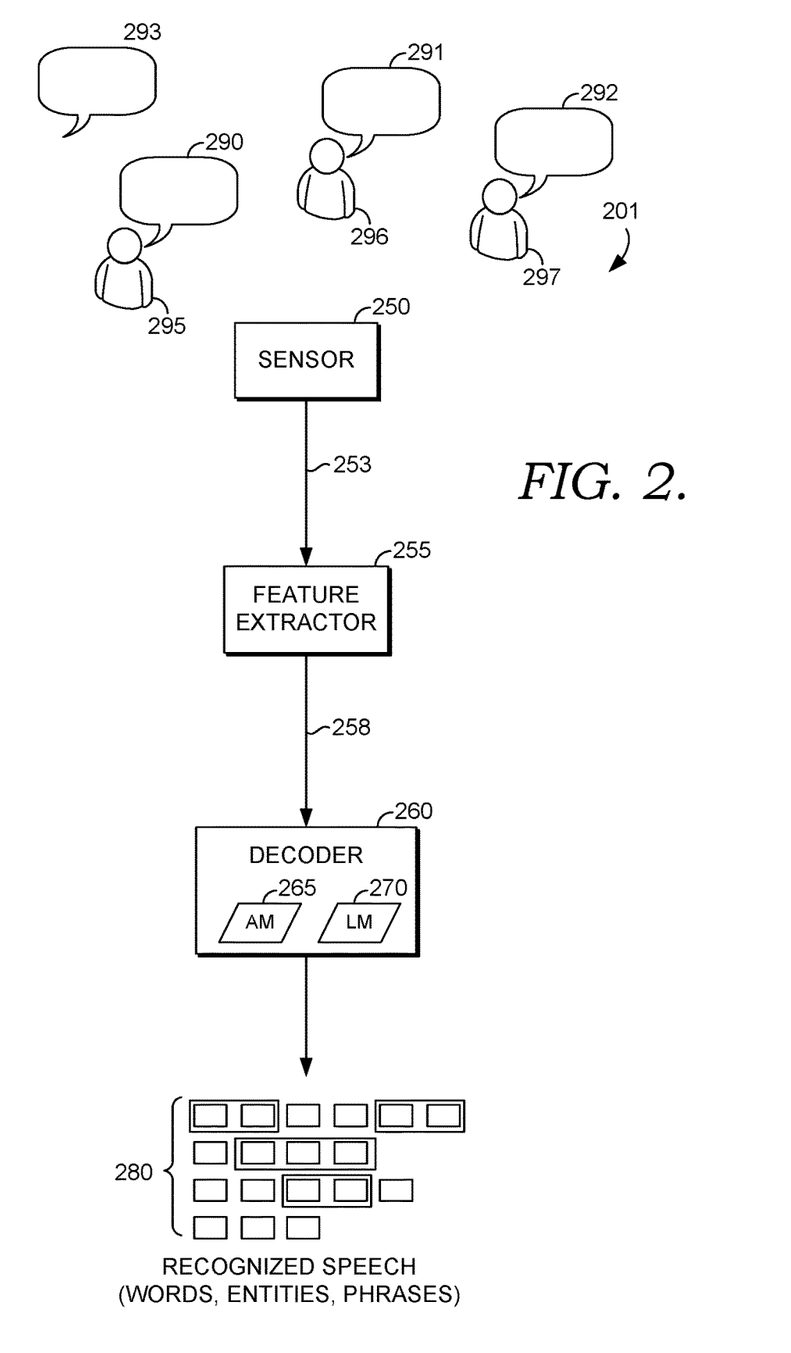
FIG. 2 is a diagram depicting an automatic speech recognition system, in accordance with an aspect of the technology described herein.
Figure 5:
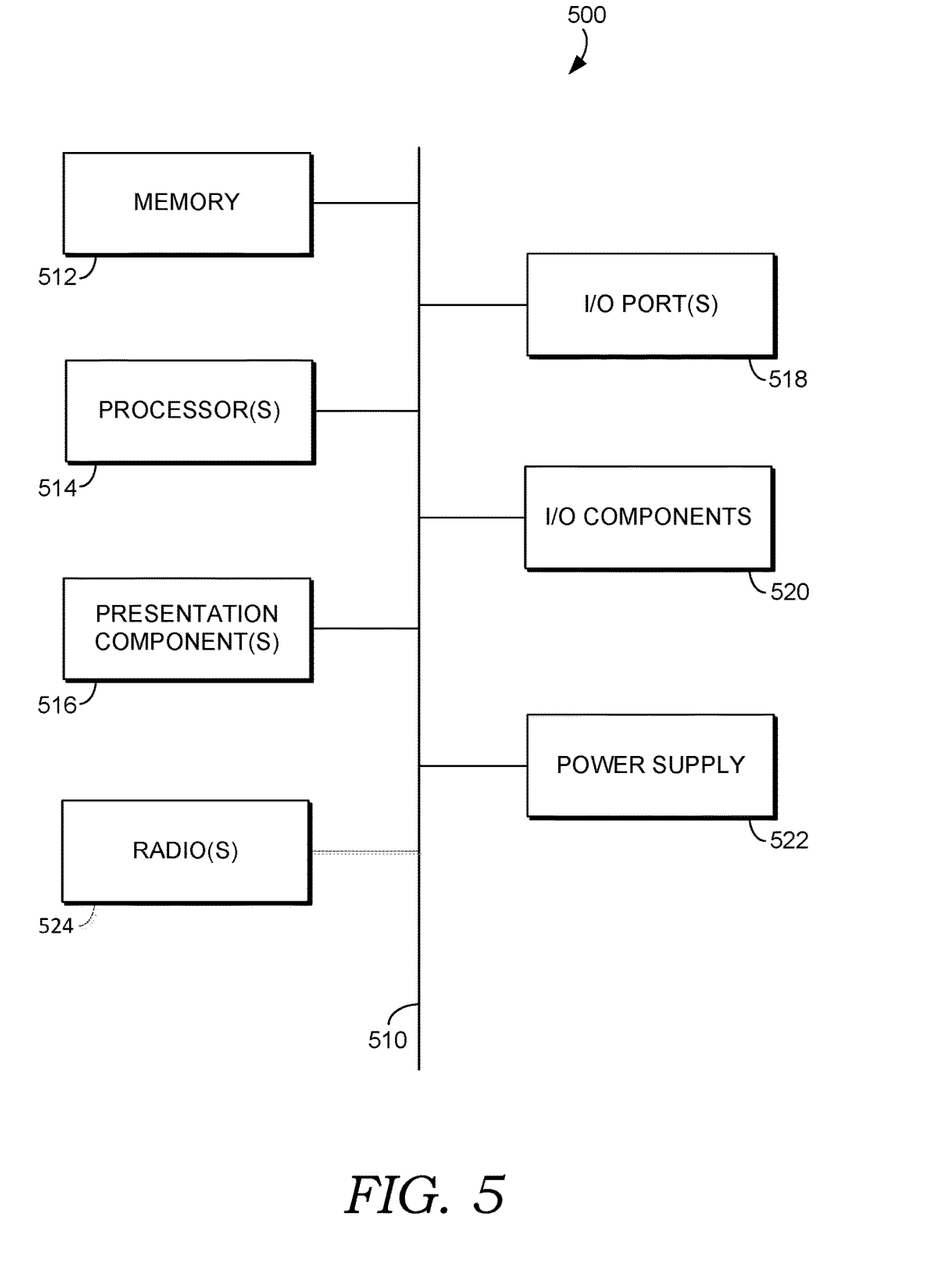
FIG. 5 is a block diagram of an exemplary computing environment suitable for implementing aspects of the technology described herein.

Automatic Speech Recognition System Using RNN with Multiple Speaker-specific Output Layers Turning now to FIG. 2, an example of an automatic speech recognition (ASR) system 201 is shown according to an embodiment of the technology described herein. The ASR system 201 shown in FIG. 2 is just one example of an ASR system that is suitable for use with a multiple-output layer RNN model for identifying a speaker-specific speech signal that can ultimately be used to understand the speaker's speech. It is contemplated that other variations of ASR systems may be used including ASR systems that include fewer components than the example ASR system shown here, or additional components not shown in FIG. 2. The ASR system can be implemented on a computing device having a processor and memory, such as computing device 500 described subsequently. The memory can comprise computer executable code that configures the computing device to perform the ASR functions described herein once executed.

The ASR system 201 shows a sensor 250 that senses acoustic information (audibly spoken words or speech 290, 291, 292) provided by user-speakers 295, 296, and 297 respectfully as well as background noise 293. The background noise can include music, crowd noise, etc. Sensor 250 may comprise one or more microphones or acoustic sensors, which may be embodied on a user device (such as client devices 102 or 104, described in FIG. 1). Sensor 250 converts the speech 290, 291, 292, and background noise 293 into acoustic signal information 253 that may be provided to a feature extractor 255 (or may be provided directly to decoder 260, in some embodiments). In some embodiments, the acoustic signal may undergo preprocessing (not shown) before feature extractor 255. Feature extractor 255 generally performs feature analysis to determine the parameterized useful features of the speech signal while reducing noise corruption or otherwise discarding redundant or unwanted information. Feature extractor 255 transforms the acoustic signal into a features 258 (which may comprise a speech corpus) appropriate for the models used by decoder 260. The features 258 can include features that correspond to the speech 290, 291, 292, and noise 293.

Decoder 260 comprises an acoustic model (AM) 265 and a language model (LM) 270. AM 265 can use a multiple-output layer RNN model to extract features for individual speakers from the features 258 provided. In one aspect, the features can be extracted by generating an acoustic mask for the individual speaker's signal. Once a feature set is generated for each speaker, the AM 265 can process the speaker-specific features to identify words and sounds. AM 265 comprises statistical representations of distinct sounds that make up a word, which may be assigned a label called a "phoneme." The AM 265 can assign the labels to sounds. AM 265 can model the phonemes based on the speech features and provides to LM 270 a corpus comprising a sequence of words corresponding to the speech corpus. As an alternative, the AM 265 can provide a string of phonemes to the LM 270. LM 270 receives the corpus of words or phonemes and determines a recognized speech 280, which may comprise words, entities (classes), or phrases.

In some embodiments, the LM 270 may reflect specific subdomains or certain types of corpora, such as certain classes (e.g., personal names, locations, dates/times, movies, games, etc.), words or dictionaries, phrases, or combinations of these.

Turning now to FIG. 3, a visual representation of a recurrent neural network (RNN) with multiple speaker-specific output layers is shown, in accordance with an aspect of the technology described herein. FIG. 3 also shows data sets 301, 302, and 303, which are shown for purposes of understanding, but which are not considered a part of multiple-output layer RNN 300. The multiple-output layer RNN 300 includes an input layer 310. The input layer 310 includes a plurality of nodes that each correspond to an input type. In one aspect, an audio signal is processed using one or multiple types of feature extraction processes. The features can comprise multiple representations extracted during different methods. Exemplary methods include amplitude modulation spectrograph, relative spectral transform and perceptual linear prediction, mel-frequency, cepstral coefficients, and cochleagram response. Each methodology may be used to generate a different set of representations for the audio signal. For example, the representations may comprise representations associated with different frequency ranges within the audio signal. Each representation can be input to a node trained to receive that type of representation. For example, the nodes ($X_1$, $X_2$, $X_3$ ... $X_{80}$) associated with dataset A 301 may be trained to receive features extracted using amplitude modulation spectrograms. The nodes ($X_{81}$, $X_{82}$, $X_{83}$ ... $X_{120}$) associated with dataset B 302 can be trained to receive features extracted using perceptual linear prediction. The nodes ($X_{121}$, $X_{122}$, $X_{123}$ ... $X_n$) associated with dataset C 303 could be trained to receive features generated according to one of the other methods provided.

The multiple-output layer RNN 300 includes multiple hidden layers including a first hidden layer 312, a second hidden layer 314, and a top hidden layer 318. The layers each comprise nodes (shown as circles) that perform functions using the input received from nodes in a lower layer. The weights used by a function associated with each node can be established during training. A line 305 connects each node in the input layer 310 to each node in the first hidden layer 312. (For the sake of simplicity a line is not shown in between each node.) For example, an individual node within the first hidden layer 312 can receive input from each node in the input layer 310 and perform a calculation using the input to generate an output. The output generated from each node in the first hidden layer 312 can be passed to each node in the second hidden layer 314. The nodes in second hidden layer 314 then perform additional calculations using a designated function and generate an output which is passed to the nodes in the top hidden layer 318.

Each node in the first hidden layer 312 performs a calculation to generate an output that is then fed into each node in the second hidden layer 314. The different nodes may give different weight to different inputs resulting in a different output. The weights and other factors unique to each node that are used to perform a calculation to produce an output are described herein as "node parameters" or just "parameters." The node parameters are learned through training. Nodes in second hidden layer 314 pass results to nodes in the top hidden layer 318.

Each hidden layer can be a simple fully-connected layer, a convolution layer, or a recurrent layer such as a long short-term memory (LSTM) layer.

The multiple-output layer RNN 300 has multiple output layers, each of which is meant to trace one speaker (or noise) and represents the mask for that speaker (or noise). These output layers (320, 321, and 322) have the same size and are normalized for each output unit across all output layers. The actual normalization might be different for different masking approaches. If the real-valued ideal ratio mask (IRM) is used, the normalization can be done using softmax. If the complex ideal ratio mask (cIRM), with which the real and imaginary parts of the mask are estimated separately and combined later, then complex-valued normalization can be employed.

The results from each node in the top hidden layer 318 is then passed to a speaker-specific output layer. All of the nodes in the top hidden layer 318 would pass their calculation to each of the nodes in the first speaker's output layer 321, all of the nodes in the second speaker's output layer 320, and all of the nodes in the noise output layer 322. The nodes in the speaker-specific output layers perform a final calculation and generate a result set. The first speaker's output layer 321 generates a first result set 330. The second speaker's output layer 320 generates a second result set 332. The noise output layer 322 generates a third result set 334.

The output layer is shown with multiple nodes but could have as few as a single node. For example, the output layer could output a single classification for an acoustic input.

The result set can be passed back to one or more layers within the multiple-output layer RNN 300 for processing as an input. In one aspect, the result set is passed back to the output layer. Accordingly, the previous result set 346 is passed back to the noise output layer 322 and used to calculate the current third result set 334. The previous result set 344 for the second speaker is passed back to the second speaker's output layer 320 and used to generate the second result set 332. The previous result set 342 for the first speaker is passed back to the first speaker's output layer 321 and used to generate the first result set 330.

As mentioned, the input layer can receive features on a frame-by-frame basis or on a window-of-frames basis. Whatever the unit of input, the result set can be input back into the multiple-output layer RNN 300 to be used to calculate an output for a subsequent frame or window of frames. In one aspect, the result set is input back into the speaker-specific layer only (as shown). In another aspect, the result set is input back into the top hidden layer 318. As aspects of the technology are not limited to use with an multiple-output layer RNN with three hidden layers, the result set could be passed back to the top hidden layer which could be a fifth hidden layer, an eighth hidden layer, a twelfth hidden layer, etc. The top hidden layer is the layer that feeds outputs to the speaker-specific output layers. It should also be noted that one or more of the speaker-specific output layers can actually be designed to capture a particular background noise.

The result set 330 can be used to form an input mask for the speaker's voice. The input mask can be used to differentiate the speaker's audible input from the sounds of other speakers and background noise. Once the speaker's voice is isolated in an audio signal the signal can be processed for speech recognition.

In an aspect, the multiple-output layer RNN 300 includes a gate between the top hidden layer 318 and each output layer. The gates shown include gate 325 between the top hidden layer 318 and the first speaker's output layer 321, gate 326 between the top hidden layer 318 and the noise output layer 322, and gate 328 between the top hidden layer 318 and the second speaker's output layer 320. Each gate is opened or closed on a frame by frame basis according to the previous output from the associated output layer and the current input. When the gate is closed, data is not sent from the top hidden layer 318 to the output layer associated with the gate. The goal is to close the gate when the signal associated with a speaker's voice is not received, for example, when a speaker stops talking. Closing the gate effectively sets the output masks in the corresponding output layer to be 0 and thus that output layer can be removed from the whole picture. In other words, the use of gates allows the number of output layers to be changed dynamically. In one aspect, the multiple-output layer RNN 300 is initiated with three or more speaker specific output layers, such as five layers, seven layers, ten layers, or fifteen layers. The layers are activated and deactivated as needed using the gates. The gates can be controlled automatically using another trained network similar to that in the LSTM RNNs.

Figure 4:
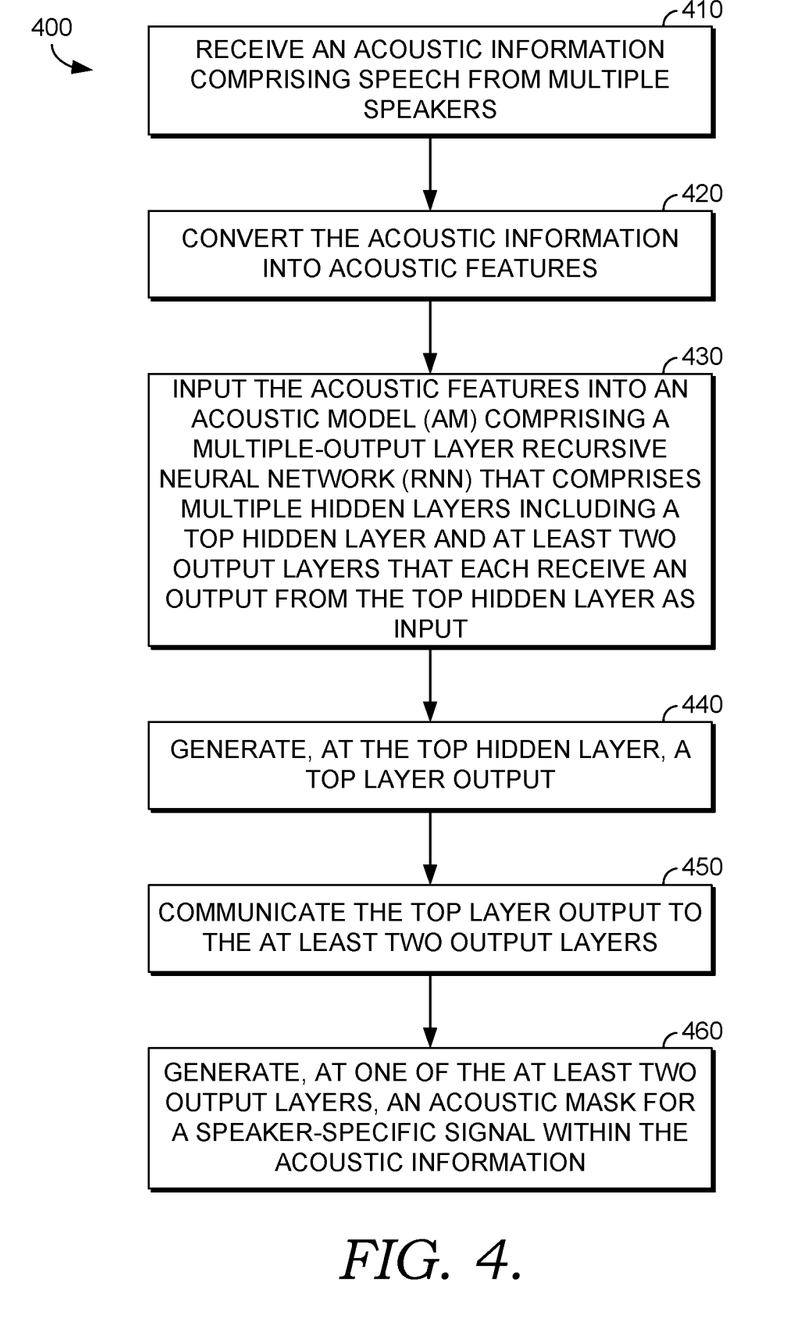
FIG. 4 is a flow chart depicting a method of using a multiple-output layer RNN to separate speakers within a multi-speaker audio signal, in accordance with an aspect of the technology described herein.

Turning now to FIG. 4, a method 400 of using a multiple-output layer RNN to identify separate speaker signals within a multi-speaker audio signal is provided. In one aspect, method 400 is performed on a client device similar to client devices 102 and 104.

At step 410, an acoustic information comprising speech from multiple speakers is received. The utterances of multiple speakers talking simultaneously can be captured at a single microphone forming the acoustic information. In one aspect, the signal associated with each speaker has roughly the same power level. In other words, the speakers could be speaking in approximately the same volume at the same distance from the microphone. In other words, the power level of the signal associated with each speaker may not help distinguish the individual signals with the acoustic information.

At step 420, the acoustic information is converted into acoustic features. The features can comprise multiple representations extracted during different methods. Exemplary methods include amplitude modulation spectrograph, relative spectral transform and perceptual linear prediction, mel-frequency, cepstral coefficients, and cochleagram response. Each methodology may be used to generate a different set of representations for the audio signal. For example, the representations may comprise representations associated with different frequency ranges within the audio signal.

At step 430, the acoustic features are input into an acoustic model (AM) comprising a multiple-output layer RNN that comprises multiple hidden layers including a top hidden layer and at least two output layers that each receive an output from the top hidden layer as input. As mentioned, the input layer can receive features on a frame-by-frame basis or on a window-of-frames basis. Each representation can be input to a node within the input layer trained to receive that type of representation.

The input layer transfers the received input to the lowest hidden layer of the multiple-output layer RNN. Each hidden layer of the multiple-output layer RNN performs calculations according to the function associated with each node and the parameters set during training. The output from one hidden layer is passed successively through the hidden layers to the top hidden.

At step 440 a top hidden-layer output is generated at the top hidden layer of the multiple-output layer RNN. The top hidden-layer output is generated using the input received from a lower hidden layer. In one aspect, the top-hidden layer receives the final output from a previous frame and uses the final output with the input received from the lower hidden layer to calculate the top hidden-layer output.

At step 450, the top hidden-layer output is communicated to the at least two output layers. As mentioned each output layer is associated with a noise source or a speaker. As mentioned previously, a gate may be present between the top hidden layer and the output layer. The top hidden-layer output can be passed through on the gates that are open. The gates model whether or not an individual speaker is active in the frame.

At step 460 an acoustic mask for a speaker-specific signal within the acoustic information is generated at one of the at least two output layers. In one aspect, an acoustic mask is generated at each output layer. The acoustic mask can be used to isolate a signal associated with a single speaker for further processing.

Exemplary Operating Environment

Referring to the drawings in general, and initially to FIG. 5 in particular, an exemplary operating environment for implementing aspects of the technology described herein is shown and designated generally as computing device 500. Computing device 500 is but one example of a suitable computing environment and is not intended to suggest any limitation as to the scope of use or functionality of the technology described herein. Neither should the computing device 500 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 5, computing device 500 includes a bus 510 that directly or indirectly couples the following devices: memory 512, one or more processors 514, one or more presentation components 516, input/output (I/O) ports 518, I/O components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 5 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 512 includes computer storage media in the form of volatile and/or nonvolatile memory. The memory 512 may be removable, non-removable, or a combination thereof. Exemplary memory includes solid-state memory, hard drives, optical-disc drives, etc. Computing device 500 includes one or more processors 514 that read data from various entities such as bus 510, memory 512, or I/O components 520. Presentation component(s) 516 present data indications to a user or other device. Exemplary presentation components 516 include a display device, speaker, printing component, vibrating component, etc. I/O ports 518 allow computing device 500 to be logically coupled to other devices including I/O components 520, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 514 may be direct or via a coupling utilizing a serial port, parallel port, and/or other interface and/or system bus known in the art. Furthermore, the digitizer input component may be a component separated from an output component such as a display device, or in some embodiments, the usable input area of a digitizer may be coextensive with the display area of a display device, be integrated with the display device, or may exist as a separate device overlaying or otherwise appended to a display device. Any and all such variations, and any combination thereof, are contemplated to be within the scope of embodiments of the technology described herein.

An NUI processes air gestures, voice, or other physiological inputs generated by a user. Appropriate NUI inputs may be interpreted as ink strokes for presentation in association with the computing device 500. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

A computing device may include a radio 524. The radio 524 transmits and receives radio communications. The computing device may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Embodiments

Embodiment 1. An automatic speech recognition (ASR) system comprising: a processor; computer storage memory having computer-executable instructions stored thereon which, when executed by the processor, configure an acoustic model; an acoustic sensor configured to convert an acoustic input comprising speech from multiple speakers into acoustic information; and the acoustic model (AM) comprising a multiple-output layer recursive neural network (RNN) configured to generate an acoustic mask for a speaker-specific signal within the acoustic information, the multiple-output layer RNN comprising multiple hidden layers including a top hidden layer and multiple output layers that each receive an output from the top hidden layer as input.

Embodiment 2. The system of embodiment 1, wherein each of the output layers is associated with a sound source.

Embodiment 3. The system as in any of the preceding embodiments, wherein the multiple-output layer RNN comprises a first output layer associated with a first target speaker and a second output layer associated with a second target speaker.

Embodiment 4. The system as in any of the preceding embodiments, wherein the multiple-output layer RNN comprises a first output layer associated with a first target speaker and a second output layer associated with background noise.

Embodiment 5. The system as in any of the preceding embodiments, wherein the multiple-output layer RNN communicates a first output for a first acoustic frame generated by a first output layer to the first output layer for calculating a second output for a second acoustic frame, wherein the second acoustic frame is directly subsequent to the first acoustic frame.

Embodiment 6. The system as in any of the preceding embodiments, comprising a gate between the top hidden layer of the multiple-output layer RNN and an output layer associated with a single speaker, wherein the gate closes when a signal associated with the single speaker is not present in the acoustic information.

Embodiment 7. The system of embodiment 6, wherein the gate uses as input for an open/close calculation for a current frame an output from the output layer associated with the single speaker for a previous frame and an output from the top hidden layer for the current frame.

Embodiment 8. The system as in any of the preceding embodiments, wherein nodes in the multiple-output layer RNN are trained using one of an ideal ratio mask (IRM) or complex ideal ratio mask (cIRM) for each frame and bin.

Embodiment 9. A method of using a multiple-output layer RNN to identify separate speaker signals within a multi-speaker audio signal, the method comprising: receiving an acoustic information comprising speech from multiple speakers; converting the acoustic information into acoustic features; inputting the acoustic features into an acoustic model (AM) comprising a multiple-output layer recursive neural network (RNN) that comprises multiple hidden layers including a top hidden layer and at least two output layers that each receive an output from the top hidden layer as input; generating, at the top hidden layer, a top hidden-layer output; communicating the top hidden-layer output to the at least two output layers; and generating, at one of the at least two output layers, an acoustic mask for a speaker-specific signal within the acoustic information.

Embodiment 10. The method as in any of the preceding embodiments, wherein the multiple-output layer RNN comprises a first output layer associated with a first target speaker and a second output layer associated with background noise.

Embodiment 11. The method as in any of the preceding embodiments, wherein the multiple-output layer RNN comprises a gate between the top hidden layer of the multiple-output layer RNN and an output layer associated with a single speaker.

Embodiment 12. The method of embodiment 11, wherein the method further comprises determining to open the gate for a current frame using as input an output from the output layer associated with the single speaker for a previous frame and an output from the top hidden layer for the current frame.

Embodiment 13. The method as in any of the preceding embodiments, further comprising communicating a result from an output layer associated with a single speaker to the top hidden layer.

Embodiment 14. The method as in any of the preceding embodiments, further comprising communicating a result from an output layer associated with a single speaker for a first frame to the output layer associated with the single speaker for use calculating an output for a subsequent frame.

Embodiment 15. The method as in any of the preceding embodiments, wherein amplitude modulation spectrograph is used to generate the acoustic features.

Embodiment 16. An automatic speech recognition (ASR) system comprising: a processor; computer storage memory having computer-executable instructions stored thereon which, when executed by the processor, configure an acoustic model; an acoustic sensor configured to convert an acoustic input comprising speech from multiple speakers into acoustic information; and the acoustic model (AM) comprising a multiple-output layer recursive neural network (RNN) configured to extract features for a speaker-specific signal within the acoustic information, the multiple-output layer RNN comprising multiple hidden layers and multiple output layers, wherein each output layer extracts the features for a single noise source.

Embodiment 17. The system as in any of the preceding embodiments, wherein the single noise source is a human speaker.

Embodiment 18. The system as in any of the preceding embodiments, wherein the system further comprises a language model configured to receive the features as input to identify human speech.

Embodiment 19. The system as in any of the preceding embodiments, wherein the multiple-output layer RNN communicates a first output for a first acoustic frame generated by an output to a top hidden layer for use in calculating a second output for a second acoustic frame, wherein the second acoustic frame is directly subsequent to the first acoustic frame.

Embodiment 20. The system as in any of the preceding embodiments, wherein the multiple-output layer RNN communicates a first output for a first acoustic frame generated by an output to the output layer for use in calculating a second output for a second acoustic frame, wherein the second acoustic frame is directly subsequent to the first acoustic frame.

Aspects of the technology described herein have been described to be illustrative rather than restrictive. It will be understood that certain features and subcombinations are of utility and may be employed without reference to other features and subcombinations. This is contemplated by and is within the scope of the claims.

The invention claimed is:

1. An automatic speech recognition (ASR) system comprising:
   a processor;
   computer storage memory having computer-executable instructions stored thereon which, when executed by the processor, configure an acoustic model;
   an acoustic sensor configured to convert an acoustic input comprising speech from multiple speakers into acoustic information;
   the acoustic model (AM) comprising a multiple-output layer recursive neural network (RNN) configured to generate an acoustic mask for a speaker-specific signal within the acoustic information, the multiple-output layer RNN comprising multiple hidden layers including a top hidden layer and multiple output layers that each receive an output from the top hidden layer as input, wherein each of the multiple output layers is associated with a sound source; and
   a gate between the top hidden layer of the multiple-output layer RNN and an output layer associated with a single speaker, wherein the gate closes when a signal associated with the single speaker is not present in the acoustic information.

2. The system of claim 1, wherein the multiple-output layer RNN comprises a first output layer associated with a first target speaker and a second output layer associated with a second target speaker.

3. The system of claim 1, wherein the multiple-output layer RNN comprises a first output layer associated with a first target speaker and a second output layer associated with background noise.

4. The system of claim 1, wherein the multiple-output layer RNN communicates a first output for a first acoustic frame generated by a first output layer to the first output layer for calculating a second output for a second acoustic frame, wherein the second acoustic frame is directly subsequent to the first acoustic frame.

5. The system of claim 1, wherein the gate uses as input for an open/close calculation for a current frame an output from the output layer associated with the single speaker for a previous frame and an output from the top hidden layer for the current frame.

6. The system of claim 1, wherein nodes in the multiple-output layer RNN are trained using one of an ideal ratio mask (IRM) or complex ideal ratio mask (cIRM) for each frame and bin.

7. A method of using a multiple-output layer RNN to identify separate speaker signals within a multi-speaker audio signal, the method comprising:
- receiving an acoustic information comprising speech from multiple speakers;
- converting the acoustic information into acoustic features;
- inputting the acoustic features into an acoustic model (AM) comprising a multiple-output layer recursive neural network (RNN) that comprises multiple hidden layers including a top hidden layer and at least two output layers that each receive an output from the top hidden layer as input, wherein the multiple-output layer RNN comprises a first output layer associated with a first target speaker and a second output layer associated with background noise, wherein the multiple-output layer RNN comprises a gate between the top hidden layer of the multiple-output layer RNN and an output layer associated with a single speaker;
- determining to open the gate for a current frame using as input an output from the output layer associated with the single speaker for a previous frame and an output from the top hidden layer for the current frame;
- generating, at the top hidden layer, a top hidden-layer output;
- communicating the top hidden-layer output to the at least two output layers; and
- generating, at one of the at least two output layers, an acoustic mask for a speaker-specific signal within the acoustic information.

8. The method of claim 7, further comprising communicating a result from an output layer associated with a single speaker to the top hidden layer.

9. The method of claim 7, further comprising communicating a result from an output layer associated with a single speaker for a first frame to the output layer associated with the single speaker for use calculating an output for a subsequent frame.

10. The method of claim 7, wherein amplitude modulation spectrograph is used to generate the acoustic features.

11. An automatic speech recognition (ASR) system comprising:
- a processor;
- computer storage memory having computer-executable instructions stored thereon which, when executed by the processor, configure an acoustic model;
- an acoustic sensor configured to convert an acoustic input comprising speech from multiple speakers into acoustic information;
- the acoustic model (AM) comprising a multiple-output layer recursive neural network (RNN) configured to extract features for a speaker-specific signal within the acoustic information, the multiple-output layer RNN comprising multiple hidden layers and multiple output layers, wherein each output layer extracts the features for a single noise source; and
- a gate between the top hidden layer of the multiple-output layer RNN and an output layer associated with a single speaker, wherein the gate closes when a signal associated with the single speaker is not present in the acoustic information.

12. The system of claim 11, wherein the single noise source is a human speaker.

13. The system of claim 11, wherein the system further comprises a language model configured to receive the features as input to identify human speech.

14. The system of claim 11, wherein the multiple-output layer RNN communicates a first output for a first acoustic frame generated by an output to a top hidden layer for use in calculating a second output for a second acoustic frame, wherein the second acoustic frame is directly subsequent to the first acoustic frame.

15. The system of claim 11, wherein the multiple-output layer RNN communicates a first output for a first acoustic frame generated by an output to the output layer for use in calculating a second output for a second acoustic frame, wherein the second acoustic frame is directly subsequent to the first acoustic frame.

16. An automatic speech recognition (ASR) system comprising:
- a processor;
- computer storage memory having computer-executable instructions stored thereon which, when executed by the processor, configure an acoustic model;
- an acoustic sensor configured to convert an acoustic input comprising speech from multiple speakers into acoustic information;
- the acoustic model (AM) comprising a multiple-output layer recursive neural network (RNN) configured to generate an acoustic mask for a speaker-specific signal within the acoustic information, the multiple-output layer RNN comprising multiple hidden layers including a top hidden layer and multiple output layers that each receive an output from the top hidden layer as input, wherein the multiple-output layer RNN comprises a first output layer associated with a first target speaker and a second output layer associated with a second target speaker; and
- a gate between the top hidden layer of the multiple-output layer RNN and an output layer associated with a single speaker, wherein the gate closes when a signal associated with the single speaker is not present in the acoustic information.

17. An automatic speech recognition (ASR) system comprising:
- a processor;
- computer storage memory having computer-executable instructions stored thereon which, when executed by the processor, configure an acoustic model;
- an acoustic sensor configured to convert an acoustic input comprising speech from multiple speakers into acoustic information;
- the acoustic model (AM) comprising a multiple-output layer recursive neural network (RNN) configured to generate an acoustic mask for a speaker-specific signal within the acoustic information, the multiple-output layer RNN comprising multiple hidden layers including a top hidden layer and multiple output layers that each receive an output from the top hidden layer as input, wherein the multiple-output layer RNN comprises a first output layer associated with a first target speaker and a second output layer associated with background noise; and
- a gate between the top hidden layer of the multiple-output layer RNN and an output layer associated with a single speaker, wherein the gate closes when a signal associated with the single speaker is not present in the acoustic information.

18. An automatic speech recognition (ASR) system comprising:
- a processor;
- computer storage memory having computer-executable instructions stored thereon which, when executed by the processor, configure an acoustic model;

an acoustic sensor configured to convert an acoustic input comprising speech from multiple speakers into acoustic information;

the acoustic model (AM) comprising a multiple-output layer recursive neural network (RNN) configured to generate an acoustic mask for a speaker-specific signal within the acoustic information, the multiple-output layer RNN comprising multiple hidden layers including a top hidden layer and multiple output layers that each receive an output from the top hidden layer as input, wherein the multiple-output layer RNN communicates a first output for a first acoustic frame generated by a first output layer to the first output layer for calculating a second output for a second acoustic frame, and wherein the second acoustic frame is directly subsequent to the first acoustic frame; and a gate between the top hidden layer of the multiple-output layer RNN and an output layer associated with a single speaker, wherein the gate closes when a signal associated with the single speaker is not present in the acoustic information.

19. An automatic speech recognition (ASR) system comprising:

a processor;

computer storage memory having computer-executable instructions stored thereon which, when executed by the processor, configure an acoustic model;

an acoustic sensor configured to convert an acoustic input comprising speech from multiple speakers into acoustic information;

the acoustic model (AM) comprising a multiple-output layer recursive neural network (RNN) configured to generate an acoustic mask for a speaker-specific signal within the acoustic information, the multiple-output layer RNN comprising multiple hidden layers including a top hidden layer and multiple output layers that each receive an output from the top hidden layer as input; and a gate between the top hidden layer of the multiple-output layer RNN and an output layer associated with a single speaker, wherein the gate closes when a signal associated with the single speaker is not present in the acoustic information.

20. A method of using a multiple-output layer RNN to identify separate speaker signals within a multi-speaker audio signal, the method comprising:

receiving an acoustic information comprising speech from multiple speakers;

converting the acoustic information into acoustic features;

inputting the acoustic features into an acoustic model (AM) comprising a multiple-output layer recursive neural network (RNN) that comprises multiple hidden layers including a top hidden layer and at least two output layers that each receive an output from the top hidden layer as input, wherein the multiple-output layer RNN comprises a gate between the top hidden layer of the multiple-output layer RNN and an output layer associated with a single speaker;

determining to open the gate for a current frame using as input an output from the output layer associated with the single speaker for a previous frame and an output from the top hidden layer for the current frame;

communicating a result from an output layer associated with the single speaker for a first frame to the output layer associated with the single speaker for use calculating an output for a subsequent frame;

generating, at the top hidden layer, a top hidden-layer output;

communicating the top hidden-layer output to the at least two output layers; and generating, at one of the at least two output layers, an acoustic mask for a speaker-specific signal within the acoustic information.

21. A method of using a multiple-output layer RNN to identify separate speaker signals within a multi-speaker audio signal, the method comprising:

receiving an acoustic information comprising speech from multiple speakers;

converting the acoustic information into acoustic features;

inputting the acoustic features into an acoustic model (AM) comprising a multiple-output layer recursive neural network (RNN) that comprises multiple hidden layers including a top hidden layer and at least two output layers that each receive an output from the top hidden layer as input, wherein the multiple-output layer RNN comprises a gate between the top hidden layer of the multiple-output layer RNN and an output layer associated with a single speaker;

determining to open the gate for a current frame using as input an output from the output layer associated with the single speaker for a previous frame and an output from the top hidden layer for the current frame;

generating, at the top hidden layer, a top hidden-layer output;

communicating the top hidden-layer output to the at least two output layers;

communicating a result from an output layer associated with a single speaker for a first frame to the output layer associated with the single speaker for use calculating an output for a subsequent frame; and generating, at one of the at least two output layers, an acoustic mask for a speaker-specific signal within the acoustic information.

* * * * *